US011440395B2

(12) United States Patent
Hu et al.

(10) Patent No.: US 11,440,395 B2
(45) Date of Patent: Sep. 13, 2022

(54) ELECTRIFIED VEHICLE TORQUE TRANSFER SYSTEM AND METHOD

(71) Applicant: Ford Global Technologies, LLC, Dearborn, MI (US)

(72) Inventors: Guopeng Hu, Northville, MI (US); Zhengyu Dai, Canton, MI (US); Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/794,308

(22) Filed: Feb. 19, 2020

(65) Prior Publication Data

US 2021/0252964 A1    Aug. 19, 2021

(51) Int. Cl.
| | | |
|---|---|---|
| *B60K 6/387* | (2007.10) | |
| *B60W 20/00* | (2016.01) | |
| *B60K 6/26* | (2007.10) | |
| *B60K 6/24* | (2007.10) | |

(52) U.S. Cl.
CPC ............ *B60K 6/387* (2013.01); *B60W 20/00* (2013.01); *B60K 6/24* (2013.01); *B60K 6/26* (2013.01)

(58) Field of Classification Search
None
See application file for complete search history.

(56) References Cited

U.S. PATENT DOCUMENTS

| | | | | |
|---|---|---|---|---|
| 6,638,193 | B2 * | 10/2003 | Hamai ................ | B60K 6/387 903/910 |
| 6,966,860 | B2 * | 11/2005 | Heitmann ............ | B60W 10/10 475/151 |
| 7,364,523 | B2 * | 4/2008 | Heitmann ............ | B60K 6/387 475/5 |
| 7,445,573 | B2 * | 11/2008 | Grumbach ............ | B60K 6/26 903/952 |
| 7,448,975 | B2 * | 11/2008 | Reisch ................ | B60K 6/365 903/952 |
| 8,047,959 | B2 | 11/2011 | Fuechtner et al. | |
| 8,123,656 | B2 | 2/2012 | Schoenek et al. | |
| 8,911,324 | B2 | 12/2014 | Yamazaki et al. | |
| 8,939,863 | B2 | 1/2015 | Hart et al. | |
| 8,942,902 | B2 | 1/2015 | Moseler | |
| 9,039,570 | B2 | 5/2015 | Doering et al. | |
| 9,115,682 | B2 | 8/2015 | Gibson et al. | |
| 9,132,834 | B2 * | 9/2015 | Ideshio ............... | B60W 20/00 |

(Continued)

FOREIGN PATENT DOCUMENTS

| | | |
|---|---|---|
| CN | 105059104 | 11/2015 |
| DE | 102017126231 | 5/2019 |
| WO | 2013091946 | 6/2013 |

*Primary Examiner* — Dirk Wright
(74) *Attorney, Agent, or Firm* — David B. Kelley; Carlson, Gaskey & Olds, P.C.

(57) ABSTRACT

An electrified vehicle torque transfer system includes, among other things, an engine having an engine shaft, an electric machine having an electric machine shaft, a first clutch that is selectively engaged to rotatably couple together the engine shaft and the electric machine shaft such that the engine can drive rotation of the electric machine, and a second clutch that is selectively engaged to rotatably couple together the engine shaft and the electric machine shaft such that the electric machine can drive rotation of the engine.

19 Claims, 3 Drawing Sheets

(56) References Cited

U.S. PATENT DOCUMENTS

| | | | |
|---|---|---|---|
| 9,340,203 B2 | 5/2016 | Gibson et al. | |
| 9,597,958 B2 | 3/2017 | Reinhart et al. | |
| 9,738,265 B2 | 8/2017 | Johri et al. | |
| 9,810,273 B2 | 11/2017 | Nedorezov et al. | |
| 9,933,023 B2 | 4/2018 | Hemphill et al. | |
| 10,005,351 B1 * | 6/2018 | Lee | B60K 6/365 |
| 10,260,613 B2 | 4/2019 | Lahr et al. | |
| 10,293,674 B1 | 5/2019 | Wilton | |
| 10,407,056 B2 | 9/2019 | Bower et al. | |
| 10,518,626 B2 * | 12/2019 | Pettersson | B60K 6/48 |
| 10,858,008 B2 * | 12/2020 | Yamada | B60K 6/48 |
| 2002/0094899 A1 * | 7/2002 | Hamai | F16H 3/725 |
| | | | 903/952 |
| 2012/0175212 A1 | 7/2012 | Hart et al. | |
| 2014/0094341 A1 * | 4/2014 | Ruder | B60K 6/48 |
| | | | 477/5 |
| 2015/0105203 A1 * | 4/2015 | Kim | B60K 6/48 |
| | | | 475/5 |
| 2018/0119758 A1 | 5/2018 | Nedrezov et al. | |
| 2019/0107187 A1 | 4/2019 | Lahr et al. | |
| 2019/0113087 A1 | 4/2019 | Johri et al. | |
| 2019/0176798 A1 | 6/2019 | Ford et al. | |
| 2019/0241175 A1 | 8/2019 | Ford et al. | |

\* cited by examiner

Fig-2

ELECTRIFIED VEHICLE TORQUE TRANSFER SYSTEM AND METHOD

TECHNICAL FIELD

This disclosure relates generally to torque transfer within an electrified vehicle powertrain.

BACKGROUND

Electrified vehicles differ from conventional electric machine vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

An electrified vehicle torque transfer system according to an exemplary aspect of the present disclosure includes, among other things, an engine having an engine shaft, an electric machine having an electric machine shaft, a first clutch that is selectively engaged to rotatably couple together the engine shaft and the electric machine shaft such that the engine can drive rotation of the electric machine, and a second clutch that is selectively engaged to rotatably couple together the engine shaft and the electric machine shaft such that the electric machine can drive rotation of the engine.

In another example of the foregoing system, the first clutch is a first disconnect clutch that can transition back and forth between a first clutch open position and a first clutch closed position. The first disconnect clutch rotatably couples together the engine shaft and the electric machine shaft when in the first clutch closed position.

In another example of any of the foregoing systems, the second clutch is a second disconnect clutch that can transition back and forth between a second clutch open position and a second clutch closed position. The second disconnect clutch rotatably couples together the engine shaft and the electric machine shaft when in the second clutch closed position.

In another example of any of the foregoing systems, the first clutch is engaged and the second clutch is disengaged when driving the electric machine shaft with the engine shaft through the first clutch. Also, the first clutch is disengaged and the second clutch is engaged when driving the engine shaft with the electric machine shaft through the second clutch.

Another example of any of the foregoing systems includes a speed reducing gear system that decreases a rotational speed of the engine shaft relative to a rotational speed of the electric machine shaft when the second clutch is rotatably coupling together the engine shaft with the electric machine shaft when the electric machine shaft is driving the engine shaft.

In another example of any of the foregoing systems, when the first clutch is rotatably coupling together the engine shaft and the electric machine shaft, one rotation of the engine shaft causes one rotation of the electric machine shaft.

In another example of any of the foregoing systems, when the second clutch is rotatably coupling together the engine shaft and the electric machine shaft, one rotation of the electric machine shaft causes less than one rotation of the engine shaft.

In another example of any of the foregoing systems, the engine shaft is configured to drive rotation of the electric machine shaft when the first clutch is rotatably coupling together the engine shaft and the electric machine shaft, and the electric machine shaft is configured to drive rotation of the engine shaft when the second clutch is rotatably coupling together the engine shaft and the electric machine shaft.

In another example of any of the foregoing systems, the first clutch has a first torque capacity and the second clutch has a second torque capacity that is less than the first torque capacity.

In another example of any of the foregoing systems, an axis of rotation of the engine shaft is coaxial with an axis of rotation of the electric machine shaft.

A torque transfer method for an electrified vehicle according to another exemplary aspect of the present disclosure includes, among other things, driving an electric machine shaft with an engine shaft by transferring torque from the engine shaft, through a first clutch, to the electric machine shaft. The method further includes driving the engine shaft with the electric machine shaft by transferring torque from the electric machine shaft, through a second clutch, to the engine shaft.

Another example of the foregoing method includes rotatably driving at least one wheel of an electrified vehicle with the electric machine shaft.

Another example of any of the foregoing methods includes driving the engine shaft with the electric machine shaft to start an engine having the engine shaft.

In another example of any of the foregoing methods, the first clutch has a first torque capacity and the second clutch has a second torque capacity that is less than the first torque capacity.

In another example of any of the foregoing methods, when driving the electric machine shaft with the engine shaft through the first clutch, one rotation of the engine shaft causes one rotation of the electric machine shaft.

In another example of any of the foregoing methods, when driving the engine shaft with the electric machine shaft, one rotation of the electric machine shaft causes less than one rotation of the engine shaft.

In another example of any of the foregoing methods, the first clutch is a first disconnect clutch, and the second clutch is a second disconnect clutch.

In another example of any of the foregoing methods, the first disconnect clutch is closed and the second disconnect clutch is open when driving the electric machine shaft with the engine shaft through the first disconnect clutch. The first disconnect clutch is open and the second disconnect clutch is closed when driving the engine shaft with the electric machine shaft through the second disconnect clutch.

Another example of any of the foregoing methods includes decreasing a rotational speed of the engine shaft relative to a rotational speed of the electric machine shaft when the electric machine shaft is driving the engine shaft through the second clutch.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to torque transfer within an electrified vehicle powertrain. In particular, the disclosure details exemplary embodiments of a clutch system that has a first clutch used to transfer torque when an engine is driving a shaft of an electric machine, and a different, second clutch used to transfer torque when the electric machine is driving a shaft of the engine to assist with starting the engine. Using the second clutch when starting the engine can permit driving the engine shaft through a gear reduction system. This enables starting of engine with less torque from the electric machine than if the gear reduction system were not used. Since less torque from the electric machine is needed to start the engine, the electric machine can reserve less torque for engine starts.

Figure 1:
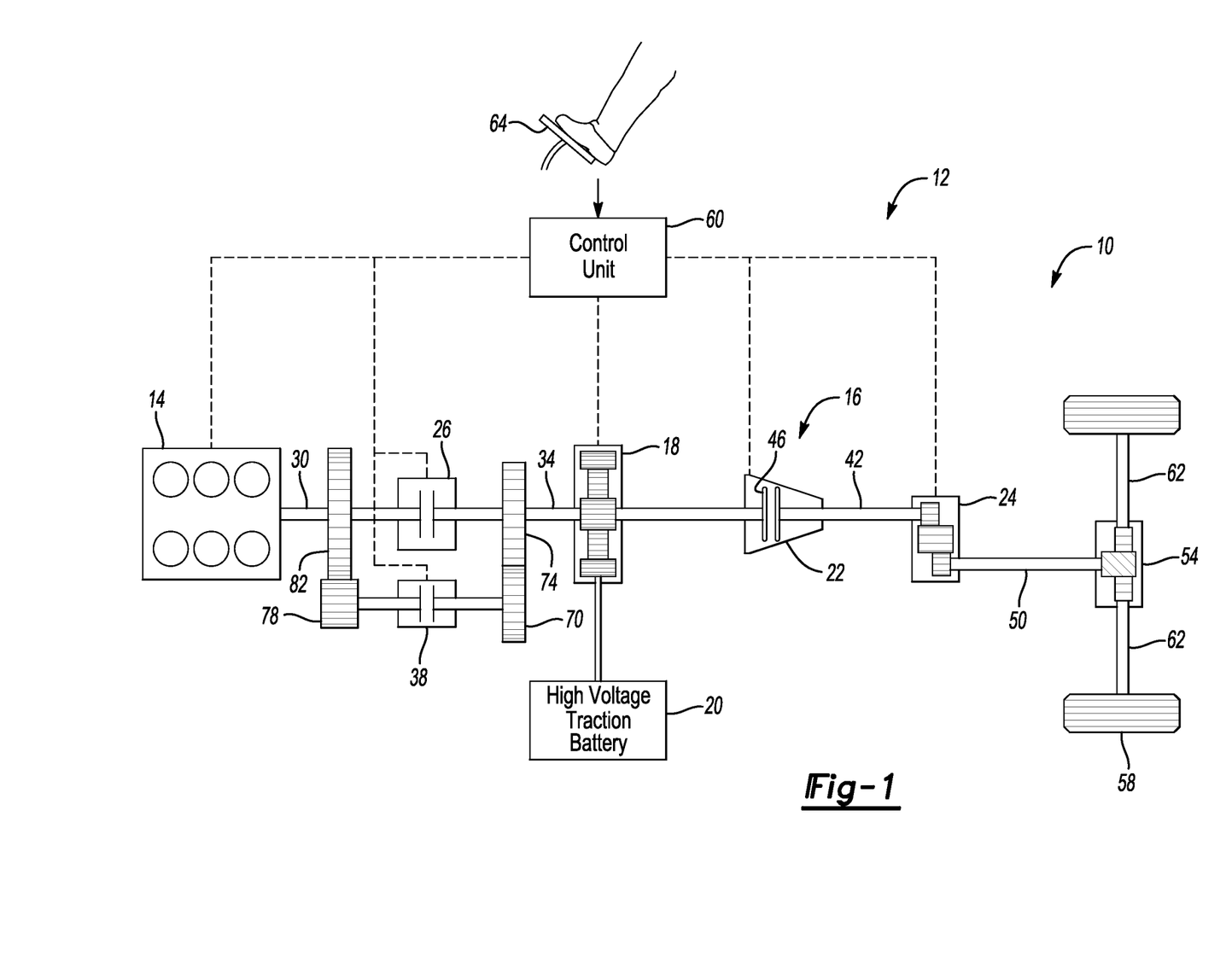
FIG. 1 illustrates a schematic view of selected portions of an electrified vehicle that incorporates a torque transfer system according to an exemplary aspect of the present disclosure.

FIG. 1 schematically illustrates selected portion of an electrified vehicle 10. Although illustrated as a hybrid electric vehicle (HEV) in some embodiments, this disclosure is applicable any type of electrified vehicle, including but not limited to full hybrid electric vehicles (FHEVs), plug-in hybrid electric vehicles (PHEVs). In addition, although a specific component relationship is illustrated in FIG. 1, this illustration is not intended to limit this disclosure. In other words, it should be readily understood that the placement and orientation of the various components of the electrified vehicle 10 could vary within the scope of this disclosure.

The exemplary electrified vehicle 10 includes a powertrain 12. The powertrain 12 includes an engine 14 and a transmission system 16 that is selectively driven by the engine 14. In an embodiment, the transmission system 16 is a modular hybrid transmission (MHT). The transmission system 16 includes an electric machine 18 that is powered by a high-voltage traction battery 20, a torque converter 22, and a multiple-step ratio automatic transmission, or transmission gearbox 24. In the exemplary embodiment, the electric machine 18 is configured as a motor. However, the electric machine 18 could alternatively be configured as a generator or a combined electric machine/generator within the scope of this disclosure.

The engine 14 and the electric machine 18 may both be employed as available drive sources for propelling the electrified vehicle 10. The engine 14 generally represents a power source that may include an internal combustion engine such as a gasoline, diesel, or natural gas powered engine, or a fuel cell.

The engine 14 generates power and corresponding torque that is supplied to the electric machine 18 when a first clutch 26 is engaged. The first clutch 26 is disposed between the engine 14 and the electric machine 18. When the first clutch 26 is engaged, an engine shaft 30 of the engine 14 is rotatably coupled to an electric machine shaft 34 of the electric machine 18 through the first clutch 26. Thus, the first clutch 26 can be engaged to rotatably couple the engine shaft 30 to the electric machine shaft 34. When the first clutch 26 is engaged, the engine shaft 30 can provide torque through the first clutch 26 to drive the electric machine shaft 34. The engine shaft 30 and the electric machine shaft 34 are rotatably decoupled when the first clutch 26 is disengaged. In this example, an axis of rotation of the engine shaft 30 is coaxial with an axis of rotation of the electric machine shaft 34.

The electric machine 18 may be any one of a plurality of types of electric machines. In an embodiment, the electric machine 18 is a permanent magnet synchronous electric machine. The electric machine 18 can be used to start the engine 14. The exemplary powertrain 12 includes a second clutch 38 that can be engaged to rotatably couple together the electric machine shaft 34 and the engine shaft 30 when the electric machine 18 is used to start the engine 14. When the second clutch 38 is engaged to rotatably couple together the electric machine shaft 34 and the engine shaft 30, the first clutch 26 is disengaged. When the second clutch 38 is engaged, the engine shaft 30 can be rotated using torque provided by the electric machine shaft 34 through the second clutch 38. The rotation of the engine shaft 30 by the electric machine 18 can held to start the engine 14.

In this example, the first clutch 26 is a first disconnect clutch that moves to an open position when disengaged, and a closed position when engaged. Further, the second clutch 38 is a second disconnect clutch that moves to an open position when disengaged, and a closed position when engaged. Disconnect clutches are sometimes referred to as KO clutches. Clutches other than disconnect clutches could be used in other examples.

When the first clutch 26 is at least partially engaged, power flow from the engine 14 to the electric machine 18 is possible. For example, the first clutch 26 may be engaged and the electric machine 18 may operate as a generator to convert rotational energy provided by the engine shaft 30 into electrical energy to be stored in the traction battery 20. When the first clutch 26 is at least partially engaged to drive the electric machine shaft 34, the second clutch 38 is disengaged.

Both the first clutch 26 and the second clutch 38 can disengaged at the same time, which effectively isolates the engine 14 from the remainder of the powertrain 12 such that the electric machine 18 can act as the sole power source for propelling the electrified vehicle 10.

The electric machine shaft 34 may extend through the electric machine 18. The electric machine 18, in the exemplary embodiment, is continuously drivably connected to the electric machine shaft 34, whereas the engine 14 and its engine shaft 30 are drivably connected to the electric machine shaft 34 when the first clutch 26 is at least partially engaged.

The electric machine 18 is connected to the torque converter 22 via the electric machine shaft 34. The torque converter 22 is therefore connected to the engine 14 when the first clutch 26 is at least partially engaged. The torque converter 22 includes an impeller fixed to the electric machine shaft 34 and a turbine fixed to a transmission input shaft 42. The torque converter 22 thus provides a hydraulic coupling between the electric machine shaft 34 and the transmission input shaft 42.

The torque converter 22 is adapted to transmit power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 46 may also be provided. When engaged, the torque converter bypass clutch 46 frictionally or mechanically couples the impeller and the turbine of the torque converter 22 to enable a more efficient power transfer. The torque converter bypass clutch 46 may be operated as a launch clutch to provide smooth vehicle launch. Alternatively, or in combination, a launch clutch similar to the first clutch 26 may be provided between the electric machine 18 and the transmission gearbox 24 for applications that do not include the torque converter 22 or the torque converter bypass clutch 46.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 50 and the transmission input shaft 42. The transmission gearbox 24 may be automatically shifted from one ratio to another based on various vehicle and ambient operating conditions by an associated controller. The transmission gearbox 24 then provides powertrain output torque to the transmission output shaft 50.

It should be understood that the hydraulically controlled transmission gearbox 24 used with the torque converter 22 is but a non-limiting embodiment of a gearbox or transmission arrangement and that any multiple ratio gearbox that accepts input torque(s) from an engine and/or an electric machine and then provides torque to an output shaft at the different ratios is acceptable for use with the embodiments of this disclosure. For example, the transmission gearbox 24 may be implemented by an automated mechanical (or manual) transmission (AMT) that includes one or more servo electric machines to translate/rotate shift forks along a shift rail to select a desired gear ratio. As generally understood by those of ordinary skill in the art, an AMT may be used in applications with higher torque requirements, for example.

The transmission output shaft 50, in the exemplary embodiment, is connected to a differential 54, which can also be referred to as a final drive. The differential 54 drives a pair of wheels 58 via respective axles 62 that are connected to the differential 54. In an embodiment, the differential 54 transmits approximately equal torque to each wheel 58 while permitting slight speed differences, such as when the electrified vehicle 10 turns a corner. Different types of differentials or similar devices may be used to distribute torque from the powertrain 12 to one or more of the wheels 58. In some applications, torque distribution may vary depending on the particular operating mode or condition, for example.

The powertrain 12 may additionally include an associated control unit 60. While schematically illustrated as a single controller, the control unit 60 may be part of a larger control system and may be controlled by various other controllers throughout the electrified vehicle 10, such as a vehicle system controller (VSC) that includes a powertrain control unit, a transmission control unit, an engine control unit, etc. It should therefore be understood that the control unit 60 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the traction battery 20, selecting or scheduling transmission shifts, actuating the first clutch 26, the second clutch 38 etc. In an embodiment, the various controllers that make up the VSC may communicate with one another using a common bus protocol (e.g., CAN).

The control unit 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 60 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 60 may communicate signals to and/or from the engine 14, the first clutch 26, the second clutch 38, the electric machine 18, the torque converter bypass clutch 46, the transmission gearbox 24, and/or other components. Although not explicitly illustrated, those of ordinary skill in the art will recognize various functions or components that may be controlled by the control unit 60 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for the first clutch 26, the second clutch 38, the torque converter bypass clutch 46, the transmission gearbox 24, and the like.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the electrified vehicle 10 or its subsystems. The computer-readable storage devices or media may include one or more of a number of known physical devices which utilize electric, magnetic, and/or optical storage to keep executable instructions and associated calibration information, operating variables, and the like.

An accelerator pedal 64 may be used by the driver of the electrified vehicle 10 to provide a demanded torque, power, or drive command to propel the electrified vehicle 10. In general, depressing and releasing the accelerator pedal 64 generates an accelerator pedal position signal that may be interpreted by the control unit 60 as a demand for increased power or decreased power, respectively. Based at least upon input from the accelerator pedal 48, the control unit 60 may command torque from the engine 14 and/or the electric machine 18. The control unit 60 also controls the timing of gear shifts within the transmission gearbox 24, as well as engagement or disengagement of the first clutch 26, the second clutch 38, and the torque converter bypass clutch 36. Like the first clutch 26 and the second clutch 38, the torque converter bypass clutch 46 can be modulated across a range between the engaged (i.e., closed) and the disengaged (i.e., open) positions. This produces a variable slip in the torque converter 22 in addition to the variable slip produced by the hydrodynamic coupling between the impeller and the turbine. Alternatively, the torque converter bypass clutch 46 may be operated as locked or open without using a modulated operating mode depending on the particular application.

To drive the electrified vehicle 10 with the engine 14, the second clutch 38 is opened and the first clutch 26 is at least partially engaged to transfer at least a portion of the engine torque through the first clutch 26 to the electric machine 18. The torque then passes from the electric machine 18 through the torque converter 22 and the transmission gearbox 24. The electric machine 18 may assist the engine 14 by providing additional power to turn the electric machine shaft 34. This operation mode may be referred to as a "hybrid mode" or an "electric assist mode."

To drive the electrified vehicle 10 using the electric machine 18 as the sole power source, the power flow remains the same except the first clutch 26 and the second clutch 38 are both opened to isolate the engine 14 from the remainder of the powertrain 12. Combustion in the engine 14 may be disabled or otherwise turned OFF during this time to conserve fuel. The power electronics (not shown) may convert DC voltage from the traction battery 20 into AC voltage to be used by the electric machine 18. The control unit 60 may command the power electronics to convert voltage from the traction battery 20 to an AC voltage provided to the electric machine 18 to provide positive or negative torque to the electric machine shaft 34. This operation mode may be referred to as an "electric only" or "EV" operation mode.

In any mode of operation, the electric machine 18 may act as an electric machine and provide a driving force for the powertrain 12. Alternatively, the electric machine 18 could act as a generator and convert kinetic energy from the electrified vehicle 10 into electric energy to be stored in the traction battery 20. The electric machine 18 may act as a generator while the engine 14 is providing propulsion power for the electrified vehicle 10, for example. The electric machine 18 may additionally act as a generator during times of regenerative braking in which rotational energy from spinning the wheels 58 is transferred back through the transmission gearbox 24 and is converted into electrical energy for storage in the traction battery 20.

From time to time, when operating in electric only mode, additional torque may be required. This can necessitate a transition from the electric only mode to the electric assist mode. At such times, starting the engine 14 with the electric machine 18 may be required.

An amount of torque from the electric machine 18 may be reserved by the control unit 60, for example. This ensures that the electric machine 18 can provide adequate torque to start the engine 14. For example, the control unit 60 may operate the electric machine 18 at no more than seventy-five percent of its maximum torque output so that twenty-five percent is available to start the engine 14, if required. As can be appreciated, the more torque from the electric machine 18 that must be reserved to start the engine 14, the less torque from the electric machine 18 that is available to drive the wheels 58 when the electrified vehicle 10 is operating in electric only mode.

In the exemplary embodiment, torque for starting the engine 14 is transferred through the second clutch 38 and is modulated by a gear system, which reduces the amount of torque from the electric machine 18 that is required to start the engine 14. Accordingly, the amount of torque from the electric machine 18 that needs to be reserved to start the engine 14 is less than what would be required if the second clutch 38 and gear system were not used.

An exemplary torque transfer system for the electrified vehicle 10 can thus utilize the engine shaft 30, the first clutch 26, and the electric machine shaft 34 when the engine shaft 30 is used to drive the electric machine shaft 34. The torque transfer system, when the electric machine shaft 34 is driving the engine shaft 30, can include the electric machine shaft 34, the gear system, the second clutch 38, and the engine shaft 30.

In the exemplary embodiment, the gear system includes a second disconnect clutch gear 70 that rotates once in response to a single rotation of the electric machine shaft 34. The second disconnect clutch gear 70 meshes directly with an electric machine shaft gear 74.

When the second clutch 38 is engaged, one rotation of the second disconnect clutch gear 70 causes a single rotation of a second disconnect clutch gear 78. The second disconnect clutch gear 78 meshes directly with an engine shaft gear 82. The second disconnect clutch gear 78 and the engine shaft gear 82 are configured such that second disconnect clutch gear 78 needs to rotate three times to cause a single rotation of the engine shaft gear 82.

Thus, in the exemplary embodiment, when the electric machine shaft 34 is driving the engine shaft 30 through the second clutch 38, the gear system is a speed reducing gear system where three rotations of the electric machine shaft 34 are required to cause a single rotation of the engine shaft 30. With such a gear system, 17 Nm of torque from the electric machine shaft 34 results in 51 Nm of torque on the engine shaft 30.

If starting the engine 14 required 50 Nm of torque on the engine shaft 30, the control unit 60 would, due to the gear system and second clutch 38, need to reserve approximately 17 Nm of torque within the electric machine 18 for starting the engine 14. If the electric machine 18 were instead starting the engine 14 through the first clutch 26, where one rotation of the electric machine shaft 34 would cause one rotation of the engine shaft 30, the control unit 60 would need to reserve approximately 50 Nm of torque within the electric machine 18 for starting the engine 14. Thus, the gear system and second clutch 38, in this embodiment, provide approximately an additional 37 Nm that can otherwise be used to operate the electrified vehicle 10 in electric only mode.

Although the speed ratio through the second clutch 38 from the electric machine 18 to the engine 14 is 3:1 other speed reduction ratios could be used and fall within the scope of this disclosure.

Notably, the torque capacity of the exemplary second clutch 38 needs to be large enough to handle starts of the engine 14, but does not need to accommodate the range of torques applied from the engine shaft 30 to the electric machine shaft 34 through the first clutch 26 when the engine 14 is used to help drive the wheels 58. Accordingly, the second clutch 38 can be configured to have a torque capacity that is less than a torque capacity of the first clutch 26. In some examples, due to the smaller torque capacity requirement, the second clutch 38 can be referred to as a micro disconnect clutch.

The lower torque capacity of the second clutch 38 can reduce the pressures within the second clutch 38 that are required to transfer torque when the second clutch 38 is engaged. Reaching higher pressures within a disconnect clutch can take time, thus reducing the pressure that must be achieved can result in quicker starts of the engine 14.

Features of the disclosed examples include a powertrain configuration incorporating a gear system, and a first and second disconnect clutch. The second disconnect clutch is engaged when an electric machine is used to start an engine. Using the gear system and second disconnect clutch can reduce required reserve torque and reduce engine start times. Since the second disconnect clutch is relatively small, noise, vibration, and harshness issues may be reduced when compared to use of a larger disconnect clutch.

A design of the second disconnect clutch can be optimized the design to have a smaller clutch torque capacity than the first disconnect clutch and a smaller clutch gain, which is defined as the ratio between clutch torque capacity versus clutch pressure. The smaller second clutch can, in some examples, have relatively precise clutch torque capacity control when compared to the first clutch. This assumes that the first and second clutches both have same pressure control range (e.g., 0 to 15 bar)

As an example of the second disconnect clutch having more precise control of the clutch torque capacity, a clutch gain of the first disconnect clutch can be 100 Nm/bar, and a clutch gain of the second disconnect clutch can be 20 Nm/bar. In response to a clutch pressure change of 1 bar, the second disconnect clutch torque capacity only changes 20 Nm whereas the first disconnect clutch torque capacity would change 100 Nm.

Figure 2:
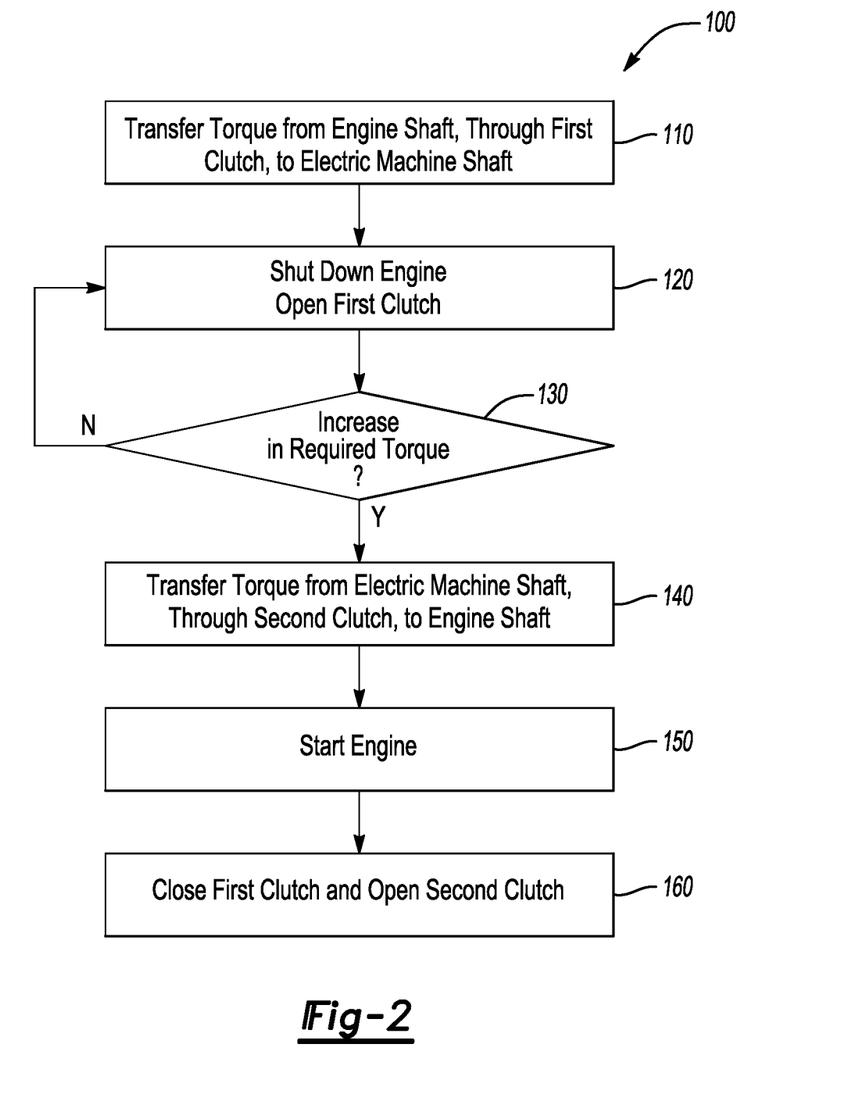
FIG. 2 illustrates a flow of a torque transfer method for the electrified vehicle of FIG. 1 according to an exemplary aspect of the present disclosure.

With reference to FIG. 2 with continuing reference to FIG. 1, an exemplary torque transfer method 100 for the electrified vehicle 10 can begin at a step 110 where the engine 14 drives the electric machine 18 by transferring torque from the engine shaft 30, through the first clutch 26, to the electric machine shaft 34. During this step, the electric machine 18 may assist in rotating the electric machine shaft 34 such that the electrified vehicle 10 is operating in a hybrid mode. During this step, the first clutch 26 is closed and the second clutch 38 is open.

At a step 120, the engine 14 shuts down due to, for example, a reduction in the torque required by the electric machine shaft 34 to propel the wheels 58 of the electrified vehicle 10. During this step, the electric machine 18 can provide sufficient torque to the electric machine shaft 34, and the electrified vehicle 10 is operating in an electric only mode. The first clutch 26 can open when torque from the engine 14 is no longer required.

Next, at a step 130, the method 100 assesses whether the torque required by the electric machine shaft 34 to propel the wheels 58 has increased. The increase can be due to the accelerator pedal 64 being depressed, for example.

In response to the increase, the method 100 moves to a step 140 where the electric machine 18 drives a start of the engine 14 by transferring torque from the electric machine shaft 34 through the second clutch 38 to the engine shaft 30.

At a step 150, the engine 14 starts in response to the rotation of the engine shaft 30. The method 100 then moves to a step 160 where the first clutch 26 closed and the second clutch 38 opened so that the engine 14 can assist in driving the electric machine 18 through the first clutch 26.

Figure 3:
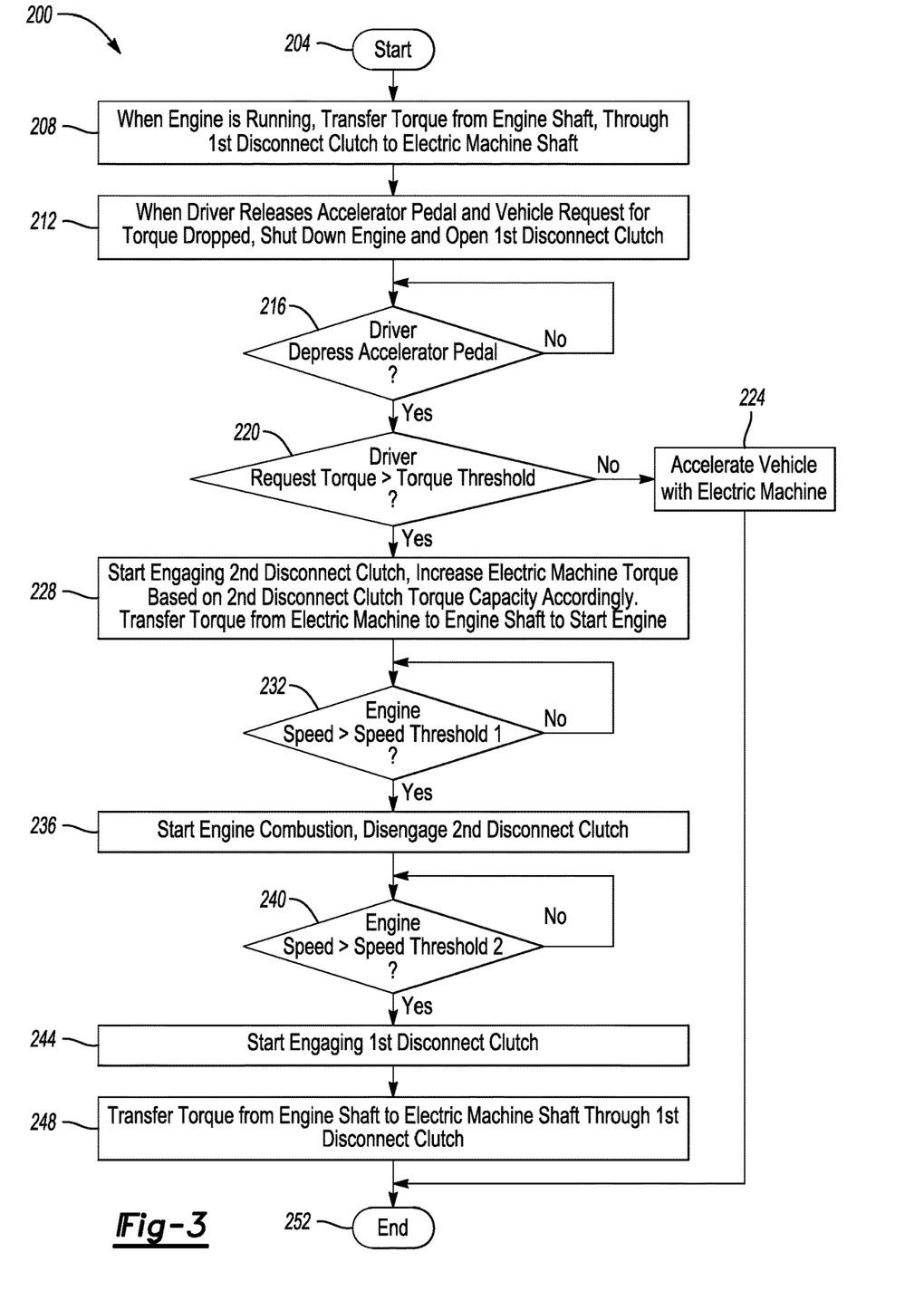
FIG. 3 illustrates a flow of a torque transfer method for the electrified vehicle of FIG. 1 according to yet another exemplary aspect of the present disclosure.

With reference to FIG. 3 and continuing reference to FIG. 1, another exemplary torque transfer method 200 for the electrified vehicle 10 begins at a step 204 and then moves to a step 208. At the step 208, the engine 14 is running, and torque is transferred from the engine shaft 30 through the first disconnect clutch 26 to the electric machine shaft 34.

Next, at a step 212, a driver releases the accelerator pedal 64 such that the vehicle 10 has a request for torque that has dropped. The engine 14 is then shut down and the first disconnect clutch 26 is transitioned to an open position.

From the step 212, the method 200 moves to a step 216 which monitors for the driver depressing the accelerator pedal 64. If yes, the method 200 moves from the step 216 to a step 220 which accesses whether the movement has been sufficient enough such that a request for torque is torque above a torque threshold. If the request for torque does not exceed a torque threshold, the method 200 moves to a step 224, which accelerates the vehicle 10 with the electric machine 18. If the request for torque is greater than the torque threshold at the step 220, the method 200 moves to a step 228.

At the step 228, the second disconnect clutch 38 starts to engage and the torque from the electric machine 18 increases based on the torque capacity of the second disconnect clutch 38. Torque then transfers through the second disconnect clutch 38 from the electric machine 18 to the engine shaft 30 to start the engine 14.

The method 200 then moves to a step 232 which assess whether a speed of the engine 14 is greater than a speed threshold. If yes, the method 200 moved from the step 232 to the step 236, which starts combustion within the engine 14 and disengages the second disconnect clutch 38. The method 200 then moves from the step 236 to a step 240, which monitors a speed of the engine 14 to access whether the speed of the engine 14 exceeds a speed threshold. If yes, the method 200 moves to a step 244 where the method 200 starts to engage the first disconnect clutch 26. The method 200 then moves from the step 244 to a step 248 where torque transfer from the engine shaft 30 to the electric machine shaft 34 through the first disconnect clutch 26. The method 200 then ends at a step 252.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle torque transfer system, comprising:
   an engine having an engine shaft;
   an electric machine having an electric machine shaft;
   a first clutch that is selectively engaged to rotatably couple together the engine shaft and the electric machine shaft such that the engine can drive rotation of the electric machine, the first clutch configured to rotate about a first axis when engaged; and
   a second clutch that is selectively engaged to rotatably couple together the engine shaft and the electric machine shaft such that the electric machine can drive rotation of the engine, the second clutch configured to rotate about a second axis when engaged, the first axis different than the second axis.

2. The electrified vehicle torque transfer system of claim 1, wherein the first clutch is a first disconnect clutch that can transition back and forth between a first clutch open position and a first clutch closed position, the first disconnect clutch rotatably coupling together the engine shaft and the electric machine shaft when in the first clutch closed position.

3. The electrified vehicle torque transfer system of claim 2, wherein the second clutch is a second disconnect clutch that can transition back and forth between a second clutch open position and a second clutch closed position, the second disconnect clutch rotatably coupling together the engine shaft and the electric machine shaft when in the second clutch closed position.

4. The electrified vehicle torque transfer system of claim 1, wherein the first clutch is engaged and the second clutch is disengaged when driving the electric machine shaft with the engine shaft through the first clutch, wherein the first clutch is disengaged and the second clutch is engaged when driving the engine shaft with the electric machine shaft through the second clutch.

5. The electrified vehicle torque transfer system of claim 1, further comprising a speed reducing gear system that decreases a rotational speed of the engine shaft relative to a rotational speed of the electric machine shaft when the second clutch is rotatably coupling together the engine shaft with the electric machine shaft and when the electric machine shaft is driving the engine shaft.

6. The electrified vehicle torque transfer system of claim 1, wherein, when the first clutch is rotatably coupling together the engine shaft and the electric machine shaft, one rotation of the engine shaft causes one rotation of the electric machine shaft.

7. The electrified vehicle torque transfer system of claim 6, wherein, when the second clutch is rotatably coupling together the engine shaft and the electric machine shaft, one rotation of the electric machine shaft causes less than one rotation of the engine shaft.

8. The electrified vehicle torque transfer system of claim 1, wherein the engine shaft is configured to drive rotation of the electric machine shaft when the first clutch is rotatably coupling together the engine shaft and the electric machine shaft, wherein the electric machine shaft is configured to drive rotation of the engine shaft when the second clutch is rotatably coupling together the engine shaft and the electric machine shaft.

9. The electrified vehicle torque transfer system of claim 1, wherein the first clutch has a first torque capacity and the second clutch has a second torque capacity that is less than the first torque capacity.

10. The electrified vehicle torque transfer system of claim 1, wherein an axis of rotation of the engine shaft is coaxial with an axis of rotation of the electric machine shaft, wherein the first axis is coaxial with the axis of rotation of the electric machine shaft, wherein the second axis is offset from the axis of rotation of the electric machine shaft.

11. A torque transfer method for an electrified vehicle, comprising:
   driving an electric machine shaft with an engine shaft by transferring torque from the engine shaft, through a first clutch, to the electric machine shaft; and
   driving the engine shaft with the electric machine shaft by transferring torque from the electric machine shaft, through a second clutch, to the engine shaft, the first clutch rotating about a first axis when engaged, the second clutch rotating about a second axis when engaged, the first axis different than the second axis.

12. The method of claim 11, further comprising rotatably driving at least one wheel of an electrified vehicle with the electric machine shaft.

13. The method of claim 11, further comprising driving the engine shaft with the electric machine shaft to start an engine having the engine shaft.

14. The method of claim 11, wherein the first clutch has a first torque capacity and the second clutch has a second torque capacity that is less than the first torque capacity.

15. The method of claim 11, wherein, when driving the electric machine shaft with the engine shaft through the first clutch, one rotation of the engine shaft causes one rotation of the electric machine shaft.

16. The method of claim 11, wherein, when driving the engine shaft with the electric machine shaft, one rotation of the electric machine shaft causes less than one rotation of the engine shaft.

17. The method of claim 11, wherein the first clutch is a first disconnect clutch, and the second clutch is a second disconnect clutch.

18. The method of claim 17, wherein the first disconnect clutch is closed and the second disconnect clutch is open when driving the electric machine shaft with the engine shaft through the first disconnect clutch, wherein the first disconnect clutch is open and the second disconnect clutch is closed when driving the engine shaft with the electric machine shaft through the second disconnect clutch.

19. The method of claim 11, further comprising decreasing a rotational speed of the engine shaft relative to a rotational speed of the electric machine shaft when the electric machine shaft is driving the engine shaft through the second clutch.

* * * * *